(12) United States Patent
Lindberg et al.

(10) Patent No.: US 10,364,077 B2
(45) Date of Patent: Jul. 30, 2019

(54) PROTECTIVE WRAPPING FOR A CYLINDRICAL OBJECT

(71) Applicant: TRIOPLAST AB, Smålandsstenar (SE)

(72) Inventors: Andreas Lindberg, Degeberga (SE); Anders Larsson, Långaryd (SE)

(73) Assignee: TRIOPLAST AB, Smålandsstenar (SE)

( * ) Notice: Subject to any disclaimer, the term of this patent is extended or adjusted under 35 U.S.C. 154(b) by 0 days.

(21) Appl. No.: 15/736,597

(22) PCT Filed: Jun. 20, 2016

(86) PCT No.: PCT/EP2016/064231
§ 371 (c)(1),
(2) Date: Dec. 14, 2017

(87) PCT Pub. No.: WO2016/207120
PCT Pub. Date: Dec. 29, 2016

(65) Prior Publication Data
US 2018/0186532 A1 Jul. 5, 2018

(30) Foreign Application Priority Data
Jun. 26, 2015 (EP) .................................... 15174050

(51) Int. Cl.
*B65D 65/10* (2006.01)
*B65D 65/22* (2006.01)
(Continued)

(52) U.S. Cl.
CPC ............. *B65D 65/10* (2013.01); *B65D 65/14* (2013.01); *B65D 65/22* (2013.01); *B65D 75/006* (2013.01);
(Continued)

(58) Field of Classification Search
CPC .......... B32B 3/06; B65D 65/10; B65D 65/14; B65D 65/22; B65D 75/00; B65D 75/006;
(Continued)

(56) References Cited

U.S. PATENT DOCUMENTS 4,268,567 A * 5/1981 Harmony ................ B29C 63/06
150/901
4,282,279 A * 8/1981 Strickland .............. B65D 25/34
206/446

(Continued)

FOREIGN PATENT DOCUMENTS

EP 0586232 A2 * 3/1994 ......... A61F 5/05816
WO 2014/009494 A1 1/2014

OTHER PUBLICATIONS

International Search Report and Written Opinion of the ISA for PCT/EP2016/064231, ISA/EP, Rijswijk, NL, dated Jul. 15, 2016.

*Primary Examiner* — Bryon P Gehman
(74) *Attorney, Agent, or Firm* — Harness, Dickey & Pierce, P.L.C.

(57) ABSTRACT

The present disclosure relates to a protective wrapping for a cylindrical object, comprising: an essentially square plastic film sheet, having a length exceeding the length of the circumference of the cylindrical object to be wrapped and a width exceeding the width of the cylindrical object to be wrapped, and having an inner face and an outer face referring to the orientation of the film when wrapped; the plastic film sheet comprising two foamed plastic strips arranged on the inner or outer face thereof, the strips arranged essentially parallel in the length direction of the plastic film sheet, at a distance from each other such that the foamed plastic strips can cover and protect the edges of the cylindrical object when wrapped. The present disclosure further relates to the use of the protective wrapping for (Continued)

wrapping a cylindrical object, particularly a reel of plastic film for baling applications.

18 Claims, 4 Drawing Sheets

(51) Int. Cl.
    *B65D 85/671*     (2006.01)
    *B65D 65/14*     (2006.01)
    *B65D 75/00*     (2006.01)
    *B65D 75/56*     (2006.01)
    *B65D 81/05*     (2006.01)

(52) U.S. Cl.
    CPC .......... *B65D 75/56* (2013.01); *B65D 81/054* (2013.01); *B65D 85/671* (2013.01); *B65D 2565/386* (2013.01); *B65D 2581/055* (2013.01); *B65D 2581/057* (2013.01); *Y02W 30/805* (2015.05)

(58) Field of Classification Search
    CPC ...... B65D 75/56; B65D 81/05; B65D 81/054; B65D 81/14; B65D 85/66; B65D 85/67; B65D 85/671; B65D 85/672; B65D 2565/386; B65D 2581/055; B65D 2581/057
    USPC .......... 206/83.5, 442, 446; 229/87.01, 87.02, 229/87.12, 89, 91
    See application file for complete search history.

(56) References Cited

U.S. PATENT DOCUMENTS

| | | | |
|---|---|---|---|
| 6,264,031 B1 | 7/2001 | Pienta et al. | |
| 6,702,114 B1 * | 3/2004 | Weder | B65B 61/025 206/423 |
| 8,033,051 B2 * | 10/2011 | Weder | B65B 25/026 47/72 |
| 2007/0158228 A1 * | 7/2007 | Bourgoin | B65D 81/03 206/446 |

* cited by examiner

PROTECTIVE WRAPPING FOR A CYLINDRICAL OBJECT

CROSS-REFERENCE TO RELATED APPLICATIONS

This application is a 371 U.S. National Stage of International Application No. PCT/EP2016/064231, filed Jun. 20, 2016, which claims the benefit of European Patent Application No. 15174050.3, filed Jun. 26, 2015. The entire disclosures of the above applications are incorporated herein by reference.

FIELD OF THE INVENTION

The invention relates to protective wrappings for cylindrical objects, particularly for reels of stretch wrap films for use in agricultural baling applications.

BACKGROUND

Baling of agricultural bulk products, such as grass, hay, silage or straw comprises compressing the product in the baling chamber of a baling apparatus to form a round or square bale and, wrapping a net or plastic film around the bale in order to retain the compressed shape, or at least to allow only little expansion, when the bale leaves the baling chamber.

For the production of silage, which requires anaerobic conditions, a protective wrapping film is then applied around the compressed bale. The protective film should provide a barrier against moisture, oxygen and UV light. By wrapping the bale with a number of layers of protective wrapping film, an airtight and waterproof layer is formed around the bale. This way, a so-called oxygen-free environment is created inside the bale, which is necessary in order to ensure successful fermentation and storage.

The protective wrapping films used for wrapping bales can be used for different kind of bales like grass, maize, sugar beet pulp, malt, straw, household refuse and other kind of materials which are packed in a bale. These films can be a standard agricultural stretch film or a pre-stretched stretch film or a barrier stretch film or any other film that can be used for wrapping bales.

Agricultural stretch wrap films typically differ from industrial stretch wrap films, as the agricultural stretch wrap films are usually colored and have to be ultraviolet stabilized, but also have to have a different elasticity and a different and greater adhesive power.

Stretch wrap films are sensitive to mechanical damage since the films are subjected to strain during and after the bale wrapping process. Mechanical damages to a roll of stretch wrap film increases the risk of tearing of the film during wrapping resulting is loss of film, loss of time and imperfectly wrapped bales. The end surfaces of the film reel are particularly important to protect, since damages to the end surfaces can create multiple weakening points, rendering the entire reel useless. Handling, transport and storage prior to use of reels of stretch wrap films therefore requires suitable packaging.

Currently, agricultural stretch wrap films for bale wrapping applications are commonly packaged in a cardboard box. The box serves to protect the reel of film during handling, transport and storage. In particular, the cardboard box is intended to protect the film from, e.g., mechanical damage prior to use. However, the use of cardboard boxes also has its limitations. Particularly, cardboard boxes lead to a significant amount of waste. Boxes are torn during unpacking in the field producing high volumes of cardboard which must be collected, stored and disposed of.

Simple plastic wrapping of the film reels has also been contemplated, but does not provide sufficient protection particularly of the sensitive end surfaces of the reels.

WO 2014/009494A1 describes an alternative solution wherein an annular plate, e.g. of cardboard, is arranged to cover each of the annular sides of the film reel, before the film reel is wrapped in plastic. The annular plates protect the annular sides of the film reel from damage during handling and transport. However, the solution in WO 2014/009494A1 suffers from the disadvantage of resulting in several pieces of waste when the film reel is unwrapped. At least the two annular plates and the plastic used for wrapping the film reel with the annular plates. This is problematic, since unwrapping is typically done out in the fields, and pieces of waste may easily be scattered by wind or forgotten. Furthermore, the annular plates are typically made of cardboard, which means that the annular plates and the plastic used for wrapping the film reel are not suitable for recycling together.

In view thereof, there exists a need for improved packaging products and/or arrangements for reels of stretch wrap film.

SUMMARY OF THE INVENTION

It is an object of the present disclosure to provide an improved wrapping for cylindrical objects, particularly for reels of stretch wrap films for use in agricultural baling applications, which addresses at least some of the deficiencies in the prior art as discussed above.

It is a further object of the present disclosure to provide a wrapping for reels of stretch wrap film, particularly for agricultural baling applications, which simplifies collection, storage and/or disposal after unwrapping.

It is a further object of the present disclosure to provide a wrapping for reels of stretch wrap film for agricultural baling applications, which is easy to unwrap.

It is a further object of the present disclosure to provide a wrapping for reels of stretch wrap film, particularly for agricultural baling applications, which can be easily unwrapped without any tools.

It is a further object of the present disclosure to provide a wrapping for reels of stretch wrap film, particularly for agricultural baling applications, which is suitable for unwrapping when the reel is mounted in the bale wrapper.

According to aspects illustrated herein, there is provided a protective wrapping for a cylindrical object, comprising: an essentially square plastic film sheet, having a length exceeding the length of the circumference of the cylindrical object to be wrapped and a width exceeding the width of the cylindrical object to be wrapped, and having an inner face and an outer face referring to the orientation of the film when wrapped;

the plastic film sheet comprising two foamed plastic strips arranged on the inner or outer face thereof, the strips arranged essentially parallel in the length direction of the plastic film sheet, at a distance from each other such that the foamed plastic strips can cover and protect the edges of the cylindrical object when wrapped.

Embodiments of the invention provide several advantages over prior art packaging solutions. As an example, the inventive protective wrapping can be easily collected, stored and/or disposed of after unwrapping. Because the entire protective wrapping is of plastic film or foamed plastic, it can be easily stored and transported after unwrapping with a low storage space requirement, and readily recycled.

According to some embodiments, the plastic film sheet and the foamed plastic strips are selected to be suitable for recycling together. Typically all materials of the protective wrapping will be plastic materials which can be efficiently recycled and reused together, without any further sorting. No sorting of waste is required, e.g. into cardboard and plastics, and all waste produced can be collected in one single vessel.

To further improve recycling properties, components of the protective wrapping can be formed of the same or similar polymer compositions. Typically, this means that the components are formed of a plastic materials comprised of the same base polymer. By the term "base polymer" as used herein, is meant the main polymeric component (by weight) present in the plastic material. The base polymer comprises at least 50% by weight, such as at least 60%, 70%, 80%, 90% or 95% by weight, of the solid plastic material, such as the plastic film sheet or the solid plastic material of the foamed plastic strips. The base polymer is typically a thermoplastic polymer, such as polyethylene (PE). This improves usefulness of the waste material for re-melting and re-use.

Thus, according to some embodiments, at least the plastic film sheet and the foamed plastic strips are formed from the same base polymer.

According to some embodiments, the base polymer is thermoplastic. Thermoplastic polymers are preferred for use in the invention since they can be processed using suitable hot melt processing methods, such as extrusion, film blowing, etc. The thermoplastic polymer is preferably a polyolefin, and more preferably polyethylene.

The plastic film sheet is typically of a substantially rectangular shape having two end edges and two side edges, a length defined by the distance between the end edges and a width defined by the distance between the side edges. The foamed plastic strips may be arranged on the inner or outer face of the sheet, in the length direction of the plastic film sheet and essentially parallel to each other and to the side edges of the sheet, at a distance from each other such that the foamed plastic strips can cover and protect the edges and end surfaces of the cylindrical object when wrapped.

The plastic film sheet can comprise a single layer (monofilm) or two or more layers bound to each other (e.g. coextruded or laminated film). The thickness of the film is suitably selected so as to provide sufficient mechanical strength and protective properties for the intended application. According to some embodiments the thickness of the sheet is in the range of 10-1000 μm.

A preferred application for the protective wrapping of the invention is for packaging reels of plastic film, particularly reels of stretch wrap film, for baling applications, e.g. agricultural baling applications. In such applications it is preferred that the thickness of the sheet is in the range of 20-500 μm. The length and width of the sheet is determined by the dimensions of the reel to be wrapped. The width is preferably selected such that the end surfaces of the reel are covered by the wrapping when the reel is wrapped. In some preferred embodiments, the core ends of the reel are left uncovered. Leaving the core ends of the reel uncovered allows the reel to be mounted in the bale wrapper with the wrapping still on, which minimized the risk of damages to the reel during mounting in the bale wrapper. The width of the sheet may typically be in the range of 0.2-3 m, and the length of the sheet may typically be in the range of 0.2-3 m. Preferably the width of the sheet is in the range of 0.5-1.5 m, and the length of the sheet is in the range of 0.2-2 m.

The foamed plastic strips comprise a foamed plastic material having suitable mechanical properties for protecting the edges of the wrapped object. This includes sufficient rigidity and toughness to absorb shocks and protect the edges of the wrapped object, as well as sufficient flexibility to be folded and secured the edges during wrapping.

The size of the foamed plastic strips is determined by the intended application. According to some embodiments, the width of the foamed plastic strips is in the range of 0.01-0.5 m, preferably 0.01-0.2 m. The strips should be wide enough to provide sufficient coverage of the edges of the wrapped object without risk of sliding out of place, but not wider than necessary, in order to avoid excessive use of material and bulkiness of the wrapped object. According to some embodiments, the thickness of the foamed plastic strips is in the range of 1-25 mm, preferably 1-10 mm. The thickness of the foamed plastic strips depends partly on the mechanical properties of the foamed plastic material, and should be selected so as to provide sufficient protection of the edges of the wrapped object, while avoiding excessive use of material and bulkiness of the wrapped object.

A preferred application for the protective wrapping of the invention is for packaging reels of plastic film, particularly reels of stretch wrap film, for baling applications, e.g. agricultural baling applications. In such applications it is preferred that the width of the foamed plastic strips is in the range of 0.01-0.2 m and that the thickness of the foamed plastic strips is in the range of 1-10 mm.

With a straight linear profile of the foamed plastic strips, there is a risk of excessive bulking of thicker foamed plastic material when it is folded and wrapped around the edges of the object to be protected. According to some embodiments, the outward facing edge of the foamed plastic strips, i.e. the edge facing the side edge of the plastic film sheet, has a wavelike profile to prevent bulking of the foamed plastic strips when the protective wrapping is wrapped around the edges of the cylindrical object. The wavelike profile may comprise a plurality of flaps or tabs extending outwards from a continuous portion of the strip, such that the flaps or tabs can be folded and wrapped around the edges of the object to be protected, without excessive bulking. The wavelike profile may for example comprise a triangle, sine, sawtooth, truncated triangle, truncated sine, truncated sawtooth or square type profile. The length of the flaps or tabs can be selected depending on the size of the object to be wrapped, and the extent of protection required for the end surface of the object.

The foamed plastic strips may be arranged on the inner or outer face of the plastic film sheet. In a preferred embodiment, the foamed plastic strips are arranged on the inner face of the plastic film sheet. This produces a smooth outer face of the product when wrapped, minimizing snagging during handling.

In the wrapped product, the foamed plastic strips are preferably fixed to the plastic film sheet. This arrangement provides a significant advantage in that the protective wrapping can be in one single piece and can be unwrapped in one single piece. The foamed plastic strips can be fixed continuously, e.g. laminated, or fixed intermittently, e.g. by adhesive or melt bonding in spots or lines.

According to some embodiments, the foamed plastic strips are fixed to the plastic film sheet. The foamed plastic strips may be fixed to the plastic film sheet already in the protective wrapping, prior to wrapping it around an object to be protected, or it may be fixed to the plastic film sheet during or after wrapping it around an object to be protected, e.g. in connection with folding and securing the protective wrapping around the edges of the object to be protected. The foamed plastic strips may be fixed to the plastic film sheet, e.g., by means of melt bonding or by an adhesive.

The plastic film sheet can advantageously be provided in the form of a shrink film, i.e. a film which has been pretreated such that it will shrink in a predetermined direction when subjected to a predetermined temperature. According to some embodiments, the plastic film sheet is configured to shrink in the length direction when heated. The shrink effect of such plastic film sheets is useful for folding and securing the protective wrapping around the edges of the object to be protected.

According to some embodiments, the plastic film sheet comprises a melt adhesive arranged along the width of the sheet at the inner and/or outer face thereof, such that the wrapping can be fixed by means thereof when wrapped. Following wrapping the protective wrapping with an overlap around the lateral surface of the object to be protected, this melt adhesive allows for securing an overlapping portion of the protective wrapping to an outer face of the protective wrapping. According to some embodiments, the melt adhesive is arranged intermittently along the width of the sheet. The melt adhesive may for example be arranged spot-wise in order to form spot-wise bonds along the width of the sheet. Such intermittent, e.g. spot-wise, melt adhesive facilitates unwrapping of a wrapped object without the use of tools, since a user can insert his fingers between the adhesive spots, and pull to break the spot-wise bonds.

According to some embodiments, the plastic film sheet of the protective wrapping comprises at least one handle arranged at the outer face thereof, such that a wrapped cylindrical object the can be carried by means thereof. A handle facilitates handling of a wrapped object, e.g. during transport and use. A preferred application for the protective wrapping of the invention is for packaging reels of plastic film for baling applications. Such reels typically weigh in the range of 10-100 kg and are often handled by a sole operator, e.g. during loading of the reel in the bale wrapper. In a preferred embodiment, the protective wrapping comprises two handles disposed on opposite sides of a centre portion of the plastic film sheet. Having two handles disposed on opposite sides of a centre portion of the plastic film sheet further facilitates handling and manipulation of the wrapped object.

The handle may for example be in the form of a plastic film strip partially bonded to the plastic film sheet, such that unbonded portions of the plastic film strip forms a loop which is useful as a handle.

The inventive protective wrapping may comprise several components, such as a plastic film sheet, two foamed plastic strips and, optionally, melt adhesive and a handle. According to some embodiments, all components of the protective wrapping are selected to be suitable for recycling together.

According to some embodiments, all components of the protective wrapping are formed from the same base polymer.

According to some embodiments, the base polymer is thermoplastic, preferably a polyolefin, more preferably polyethylene.

Furthermore, according to some preferred embodiments, the protective wrapping is in one single piece. The components of the protective wrapping, such as a plastic film sheet, two foamed plastic strips and, optionally, melt adhesive and a handle are preferably all integrated into one single piece. This is very useful, particularly in agricultural baling applications since it allows the protective wrapping to be easily collected, stored and/or disposed of after unwrapping. This reduces problems when unwrapping is carried out in the fields, where loose pieces of waste may easily be scattered by wind or forgotten. When the entire protective wrapping is of plastic film or foamed plastic, it can be easily stored and transported after unwrapping with a low storage space requirement, and readily recycled. It is also contemplated that the protective wrapping can be wrapped together with the agricultural baling film during the bale wrapping process and eventually be recycled together with the film. The agricultural baling film is typically made of similar plastic materials as the protective wrapping and they will be suitable for recycled together. This can even further facilitate the disposal of the protective wrapping after unwrapping in the field.

According to other aspects illustrated herein, there is provided a cylindrical object wrapped in a protective wrapping as described herein. In a preferred embodiment, cylindrical object is a reel of plastic film, particularly a reel of stretch wrap film, for baling applications, e.g. agricultural baling applications. Further embodiments and advantages of the wrapped cylindrical object in general and wrapped reel of plastic film for baling applications are described above with reference to the description of the protective wrapping. In particular, the protective wrapping can be unwrapped in one single piece, and all materials of the protective wrapping will be plastic materials which can be efficiently recycled and reused together, without any further sorting. No sorting of waste is required, e.g. into cardboard and plastics, and all waste produced can be collected in one single vessel.

According to other aspects illustrated herein, there is provided the use of a protective wrapping as described herein for wrapping a reel of plastic film for baling applications. Further embodiments and advantages of the use of a protective wrapping as described herein for wrapping a reel of plastic film for baling applications are described above with reference to the description of the protective wrapping. In particular, the protective wrapping can be unwrapped in one single piece, and all materials of the protective wrapping will be plastic materials which can be efficiently recycled and reused together, without any further sorting. No sorting of waste is required, e.g. into cardboard and plastics, and all waste produced can be collected in one single vessel.

According to other aspects illustrated herein, there is provided a method for wrapping a cylindrical object with a protective wrapping, comprising:
a) providing a protective wrapping according to any one of claims 1-18 and a cylindrical object to be wrapped;
b) wrapping the protective wrapping with an overlap around the lateral surface of the cylindrical object such that the foamed plastic strips cover the edges of the cylindrical object;
c) securing an overlapping portion of the protective wrapping to an outer face of the protective wrapping;
d) folding and securing the protective wrapping around the edges of the cylindrical object.

According to some embodiments of the wrapping method, step c) comprises bonding the inner face of an overlapping portion of the protective wrapping to an outer face of the underlying protective wrapping.

According to some embodiments of the wrapping method, the plastic film sheet of the protective wrapping is configured to shrink in the length direction when heated, and step d) comprises heating the wrapping to a predetermined shrink temperature to fold and secure the protective wrapping around the edges of the cylindrical object.

Further embodiments and advantages of the wrapping method are described above with reference to the description of the protective wrapping.

The protective wrapping described herein can be manufactured using conventional and well known production methods such as extrusion and preparation of blown and cast films, including shrink films, heat bonding and adhesive bonding of thermoplastic materials. The protective wrapping described herein is further advantageous in that it can be manufactured at high volumes using a continuous manufacturing process.

According to other aspects illustrated herein, there is provided a method of manufacturing a protective wrapping according to any one of claims 1-18, comprising:
a) providing a plastic film sheet;
b) applying at least two foamed strips to the plastic film sheet, essentially parallel in the length direction of the plastic film sheet, at a distance from each other such that the foamed plastic strips can cover and protect the edges of a cylindrical object when wrapped.

According to some embodiments of the manufacturing method, steps a) and b) are performed in a continuous process.

Further embodiments and advantages of the manufacturing method are described above with reference to the description of the protective wrapping.

The above described and other features are exemplified by the following figures and detailed description.

BRIEF DESCRIPTION OF THE DRAWINGS

Referring now to the figures, which are exemplary embodiments, and wherein the like elements are numbered alike.

DETAILED DESCRIPTION OF PREFERRED EMBODIMENTS

Figure 1:
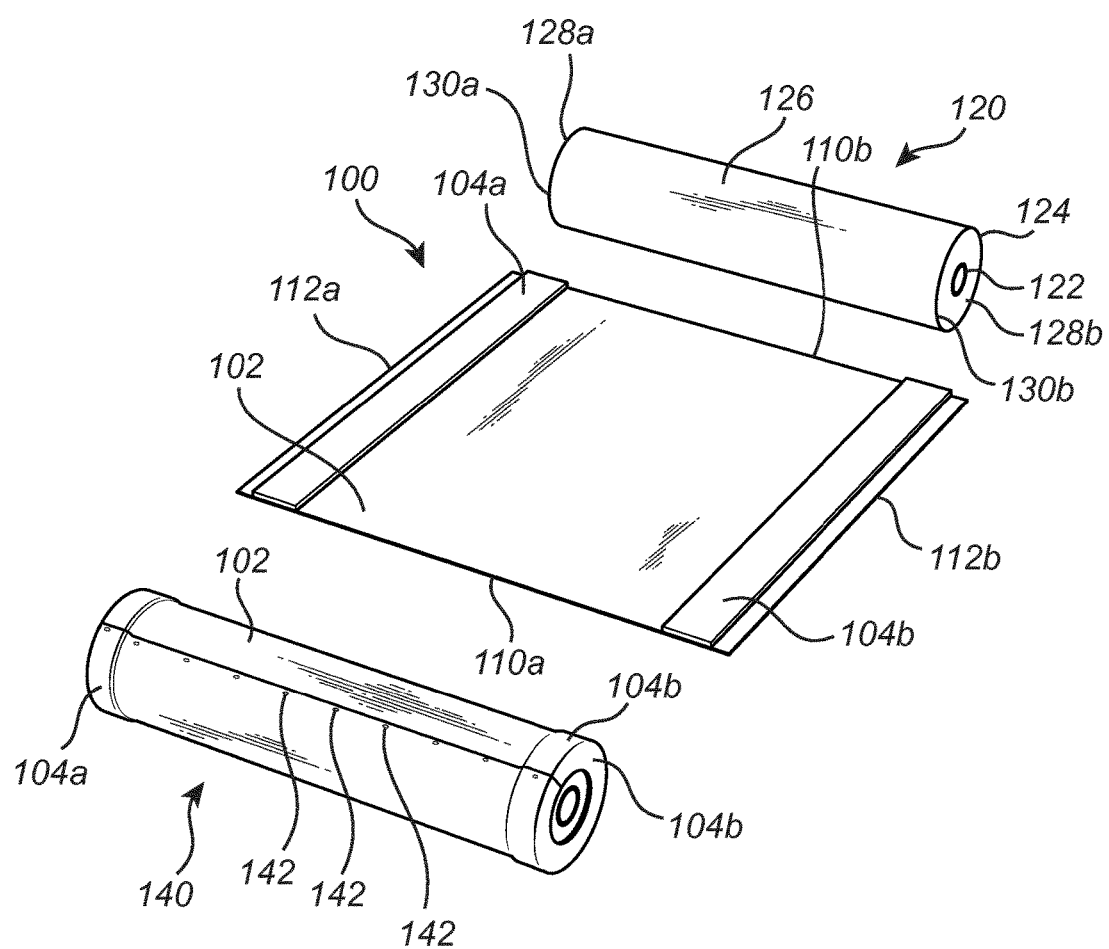
FIG. 1 shows an embodiment of the protective wrapping according to the invention, a cylindrical object to be wrapped, and a cylindrical object wrapped in the protective wrapping.

Referring to FIG. 1, the protective wrapping 100 comprises a plastic film sheet 102 and two foamed plastic strips 104*a*, 104*b* arranged in the length direction of the plastic film sheet 102.

The plastic film sheet 102 may be substantially square or rectangular shape having two end edges 110*a*, 110*b* and two side edges 112*a*, 112*b*, a length defined by the distance between the end edges and a width defined by the distance between the side edges. Depending on the dimensions of the object to be wrapped, the length of the sheet may be greater than the width of the sheet, or vice versa. The foamed plastic strips 104*a*, 104*b* may be arranged on the inner or outer face of the sheet, in the length direction of the plastic film sheet and essentially parallel to each other and to the side edges 112*a*, 112*b* of the sheet, at a distance from each other such that the foamed plastic strips can cover and protect the edges and end surfaces of the cylindrical object when wrapped.

The plastic film sheet 102 may be substantially made of polyolefin. The term "polyolefin" generally refers to homopolymers, or copolymers having a methylene linkage between monomer units which may be formed by any method known to those skilled in the art. Examples of polyolefins broadly includes polymers such as polyethylene and ethylene copolymers having a small amount of a copolymer such as vinyl acetate, ethylene-alpha olefin copolymers (LLDPE), polypropylene, polybutylene, and other polymeric resins falling in the "olefin" family classification, polyethylene (PE), low density polyethylene (LDPE), linear low-density polyethylene (LLDPE), very low-density polyethylene (VLDPE), ultra low-density polyethylene (ULDPE), medium-density polyethylene (MDPE), high-density polyethylene (HDPE), ultra high-density polyethylene (UHDPE), ethylene/propylene copolymers, polypropylene (PP), propylene/ethylene copolymer, polyisoprene, polybutylene, polybutene, poly-3-methylbutene-1, poly-4-methylpentene-1, or copolymers of ethylene with one or more alpha-olefins such as butene-1, hexene-1 or octene-1. The film may comprise polyamide (PA), ethylene vinyl alcohol copolymer (EVOH), or any other material which can improve the barrier properties.

In a preferred embodiment the plastic film sheet 102 is made of a polyethylene based film. The film may for example be an LDPE mono film, i.e. a film comprised of a single layer of LDPE. The plastic film sheet may have a film thickness in the range of 10-1000 μm. In a preferred embodiment, the plastic film sheet has a film thickness in the range of 30-300 μm, preferably in the range of 50-150 μm. In the embodiment shown in FIG. 1, the plastic film sheet 102 has a film thickness of about 110 μm. As an example the plastic film sheet can be a The protective wrapping 100 is configured for packaging a reel 120 of plastic film for baling applications. A reel of plastic film as referred to herein comprises a core 122, which is typically a substantially rigid elongated tubular element, and a roll of film 124 wound on the core. The core 122 may for example be made of a cardboard, plastic or wooden material. In some embodiments, the core may have a length exceeding the width of the wound plastic film, such that the ends of the core protrude somewhat from the end surfaces of the reel (not shown).

The reel 120 has a substantially cylindrical shape with a width a radius and a circumference, and defines a lateral surface 126 and two circular base areas (end surfaces) 128*a*, 128*b*. The lateral surface and the end surfaces are separated by the edges 130*a*, 130*b*. Reels come in a wide variety of sizes. As an example, a typical reel may have a width of 1390 mm excluding protruding core ends (1410 mm including protruding core ends), and a diameter of 229 mm.

The plastic film sheet 102 has an inner face and an outer face referring to the orientation of the film when wrapped. The plastic film sheet 101 has a length exceeding the length of the circumference of the cylindrical object to be wrapped and a width exceeding the width of the cylindrical object to be wrapped. The width is preferably selected such that the end surfaces of the reel are covered by the wrapping when the reel is wrapped. In some preferred embodiments, the core ends of the reel are left uncovered. Leaving the core ends of the reel uncovered allows the reel to be mounted in the bale wrapper with the wrapping still on, which minimized the risk of damages to the reel during mounting in the bale wrapper.

The two foamed plastic strips 104a, 104b are arranged essentially parallel in the length direction of the plastic film sheet 102, at a distance from each other such that the foamed plastic strips can cover and protect the edges 130a, 130b and parts of the end surfaces 128a, 128b of the reel 120 when wrapped.

The length of the foamed plastic strips is at least equal to the length of the circumference of the reel, such that the foamed plastic strips can at least circumscribe the edges 130a, 130b of the reel 120 when wrapped.

The foamed plastic strips 104a, 104b are preferably made of a closed cell foamed plastic. The foamed plastic strips are preferably made of a foamed polyolefin polymer. In a preferred embodiment, the foamed plastic strips comprise a foamed polyethylene. The foamed plastic strips may for example have a density in the range of 10-150 kg/m$^3$, such as in the range of 40-80 kg/m$^3$. In the embodiment shown in FIG. 1, the foamed plastic strips are made of polyethylene foam having a density of about 60 kg/m$^3$.

The foamed plastic strips typically have a width in the range of from about 1 cm to about 30 cm, preferably in the range of from about 2 cm to about 15 cm. The strips are wide enough to provide sufficient coverage of the edges of the wrapped object without risk of sliding out of place, but not wider than necessary, in order to avoid excessive use of material and bulkiness of the wrapped object. In the embodiment shown in FIG. 1, the width of the foamed plastic strips is 8-10 cm, but it is also contemplated that the strip could be made wider or narrower, such as in the range of 1-5 cm or 2-3 cm.

The thickness of the foamed plastic strips is typically in the range of 1-25 mm, preferably in the range of 1-10 mm. The thickness of the foamed plastic strips depends partly on the mechanical properties of the foamed plastic material, and should be selected so as to provide sufficient protection of the edges of the wrapped object, while avoiding excessive use of material and bulkiness of the wrapped object. The required thickness of the foamed plastic strip is of course dependent on the number of layers of the foamed plastic strip applied to the reel. If a single layer of protective wrapping is used, thicker foamed plastic strips will be required than if two or more layers of protective wrapping are used. In the embodiment shown in FIG. 1 a single layer of protective wrapping is used and the thickness of the foamed plastic strips is about 3 mm. The person skilled in the art may readily determine the type and thickness of foamed plastic strips required to provide suitable protection for an object to be wrapped.

The foamed plastic strips 104a, 104b are fixed to the inner face of the plastic film sheet 102 by thermal bonding or an adhesive. This prevents the foamed plastic strips from sliding out of place, and also facilitates collection of the waste produced during unwrapping.

The foamed plastic strips can be arranged on the plastic film sheet in the form of preformed strips and subsequently fixed to the sheet. In some embodiments, the foamed plastic strips are laminated to the plastic film sheet. In some embodiments, the foamed plastic strips are coextruded with the plastic film sheet. The foamed plastic strips can also be arranged on the plastic film sheet by direct deposition in a preferred shape of a foamed plastic precursor, such as a polymer melt which is foamed or which comprises a foaming agent capable of foaming the polymer melt. The foamed plastic precursor can be deposited in a continuous linear shape such as that shown in FIG. 1 or in a wavelike profile such as that shown in FIG. 2. Both the preformed strip and the deposition of foamed plastic precursor approaches are well suited for continuous production of the protective wrapping.

The length of the protective wrapping 100 exceeds the length of the circumference of the reel, such that the protective wrapping 100 can be wrapped with an overlap around the lateral surface of the cylindrical object such that the foamed plastic strips cover the edges of the cylindrical object. The overlapping portion is used for securing the protective wrapping 100 when wrapped around the reel 120, e.g. by bonding the inner face of an overlapping portion of the protective wrapping to an outer face of the underlying protective wrapping. The width of the sheet may typically be in the range of 0.2-3 m, and the length of the sheet may typically be in the range of 0.2-3 m. Preferably the width of the sheet is in the range of 0.5-1.5 m, and the length of the sheet is in the range of 0.2-2 m. As an example, a typical reel may have a width of 1390 mm excluding protruding core ends (1410 mm including protruding core ends), and a diameter of 229 mm. A suitable wrapping for such a typical reel could have a width of about 1500-1600 mm, and a length of about 750-850 mm.

The length of the protective wrapping 100 can be selected so as to allow for a single circumvolution, with a suitable overlap, or more than one circumvolution. If the protective wrapping 100 is wrapped several laps around the reel, it is understood that the thickness of the foamed plastic strips 104a, 104b can be reduced, as more layers of the foamed plastic strips are applied.

When the protective wrapping 100 has been wrapped and secured around the lateral surface 126 of the cylindrical object such that the foamed plastic strips 104a, 104b cover the edges of the cylindrical object, the protective wrapping 100 is also folded and secured around the edges 130a, 130b and, at least partially, the end surfaces 128a,128b of the reel. If the plastic film sheet 102 is a shrink film, the folding and securing can be achieved by heating the film to a temperature suitable to effect shrinking of the film.

It is noted that the plastic film for baling applications on the reel 120 may be sensitive to heating. This heat sensitivity may cause problems when using elevated temperatures to secure the protective wrapping 100 around the reel 120, particularly when securing the protective wrapping 100 around the edges and end surfaces of the reel. The present inventors have found that the use of foamed plastic strips alleviates this problem since in addition to providing mechanical protection, the foamed plastic materials also act as a thermal shield, keeping heat applied, e.g., when shrinking or bonding the film at the edges and end surfaces of the reel from reaching the reel.

FIG. 1 further shows a wrapped reel 140, comprising the reel 120 wrapped with a protective wrapping 100 secured with spot-wise bonds 142. The lateral surface of the reel is protected by the plastic film sheet 102 and additional protection is provided by the foamed plastic strips 104a, 104b at the edges 130a, 130b and parts of the end surfaces 128a, 128b of the reel.

In some embodiments, the foamed plastic strips is configured facilitate folding of the strips around the edges of the reel. With a straight linear profile of the foamed plastic strips, there is a risk of excessive bulking of thicker foamed plastic material when it is folded and wrapped around the edges of the object to be protected. According to some embodiments, the outward facing edge of the foamed plastic strips, i.e. the edge facing the side edge of the plastic film sheet, has a wavelike profile to prevent bulking of the foamed plastic strips when the protective wrapping is wrapped around the edges of the cylindrical object.

Figure 2:
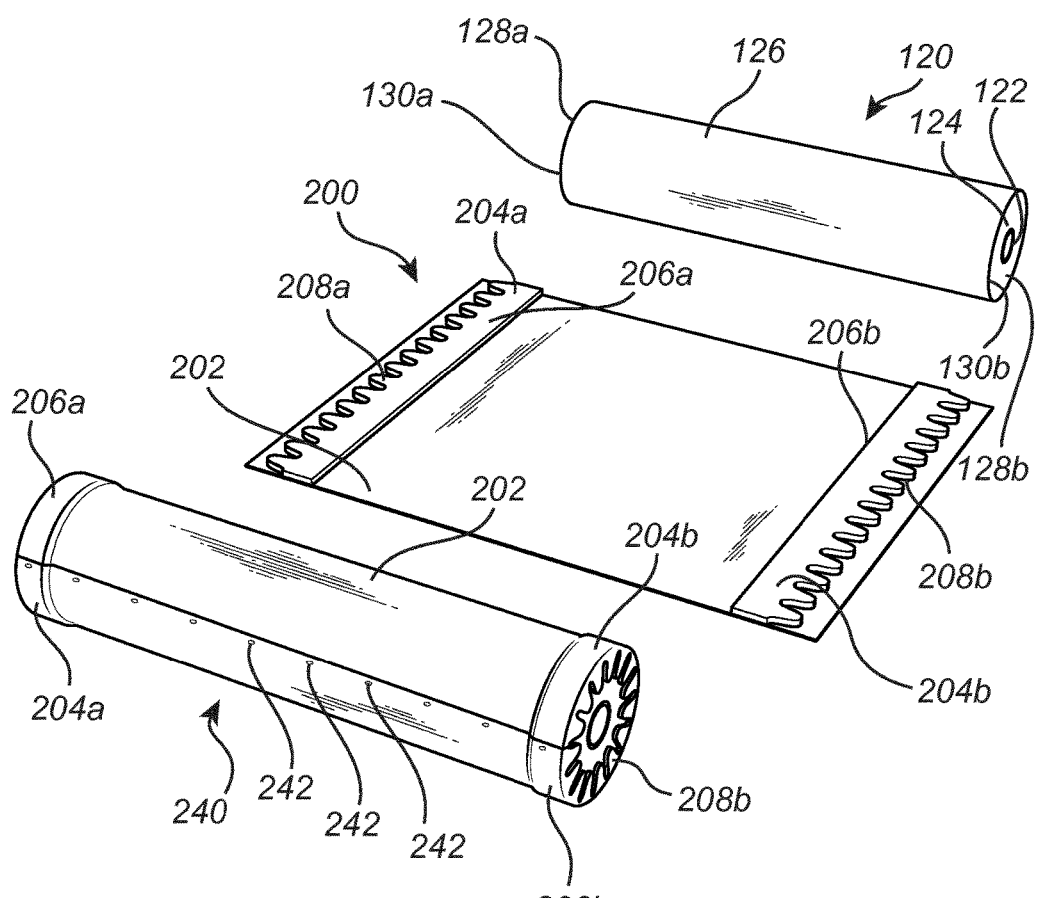
FIG. 2 shows an embodiment of the protective wrapping according to the invention with foamed plastic strips having a wavelike profile, a cylindrical object to be wrapped, and a cylindrical object wrapped in the protective wrapping.

FIG. 2 depicts a protective wrapping 200 having foamed plastic strips where the outward facing edges of the foamed plastic strips 204a, 204b have a wavelike profile. The foamed plastic strips comprise a continuous linear portion 206a, 206b and a wavelike portion 208a, 208b comprising a plurality of tabs or flaps extending outward from the continuous linear portion. The two foamed plastic strips 204a, 204b are arranged essentially parallel in the length direction of the plastic film sheet 202, at a distance from each other such that the continuous linear portions of the foamed plastic strips will circumscribe edge portions of the lateral surface of the reel, and the tabs or flaps of the wavelike can be folded to cover and protect the edges 130a, 130b and parts of the end surfaces 128a, 128b of the reel when wrapped.

FIG. 2 further shows a wrapped reel 240 comprising a reel 120 wrapped with the protective wrapping 200 having foamed plastic strips where the outward facing edges of the foamed plastic strips 204a, 204b have a wavelike profile. The protective wrapping secured with spot-wise bonds 242

The wavelike profile may comprise a plurality of flaps or tabs extending outwards from a continuous portion of the strip, such that the flaps or tabs can be folded and wrapped around the edges of the object to be protected, without excessive bulking.

In a preferred embodiment, the flaps or tabs may preferably be shaped and sized so as to substantially cover the end-surfaces 128a, 128b of the object when wrapped, without unnecessary overlap. For a reel provided on a core, the flaps or tabs may preferably be shaped and sized so as to substantially cover the area between the periphery of the reel end-surface and the core.

The wavelike profile may for example comprise a triangle, sine, sawtooth, truncated triangle, truncated sine, truncated sawtooth or square type profile. The length of the flaps or tabs can be selected depending on the size of the object to be wrapped, and the extent of protection required for the end-surface of the object. In some cases it may be desired to protect the edges and the entire end surface of the reel, whereas in other cases it may be sufficient to protect only the edges, which are the most exposed to mechanical damages. Accordingly, the length of the flaps or tabs can be in the range of from about 1 cm to about 30 cm. Typically the flaps or tabs will be in the range of from about 2 cm to about 15 cm. The width of the continuous portion of the strip may also be in the range of from about 1 cm to about 30 cm, typically in the range of from about 2 cm to about 15 cm.

According to some embodiments, the plastic film sheet of the protective wrapping comprises at least one handle arranged at the outer face thereof, such that a wrapped cylindrical object the can be carried by means thereof. A handle facilitates handling of a wrapped object, e.g. during transport and use. A preferred application for the protective wrapping of the invention is for packaging reels of plastic film for baling applications. Such reels typically weigh in the range of 10-100 kg and are often handled by a sole operator during loading of the reel in the bale wrapper. In a preferred embodiment, the protective wrapping comprises two handles disposed on opposite sides of a centre portion of the plastic film sheet. Having two handles disposed on opposite sides of a centre portion of the plastic film sheet further facilitates handling and manipulation of the wrapped object.

The handle may for example be in the form of a plastic film strip partially bonded to the plastic film sheet, such that unbonded portions of the plastic film strip forms a loop which is useful as a handle.

Figure 3A:
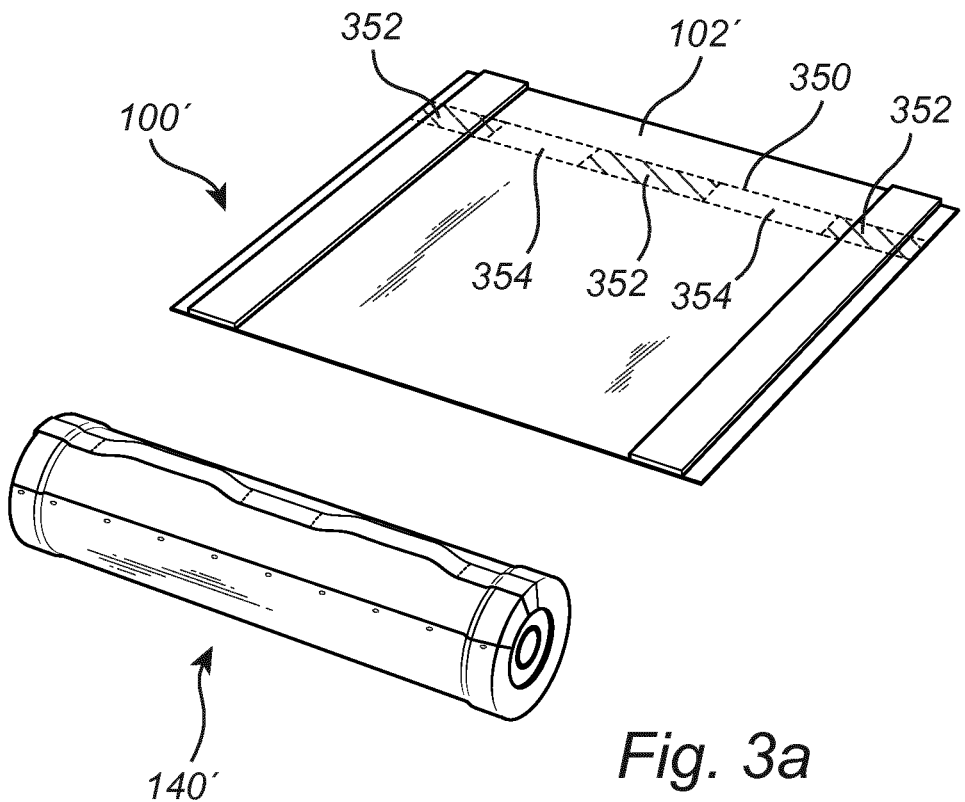
FIG. 3*a* shows an embodiment of the protective wrapping comprising handles.
Figure 3B:
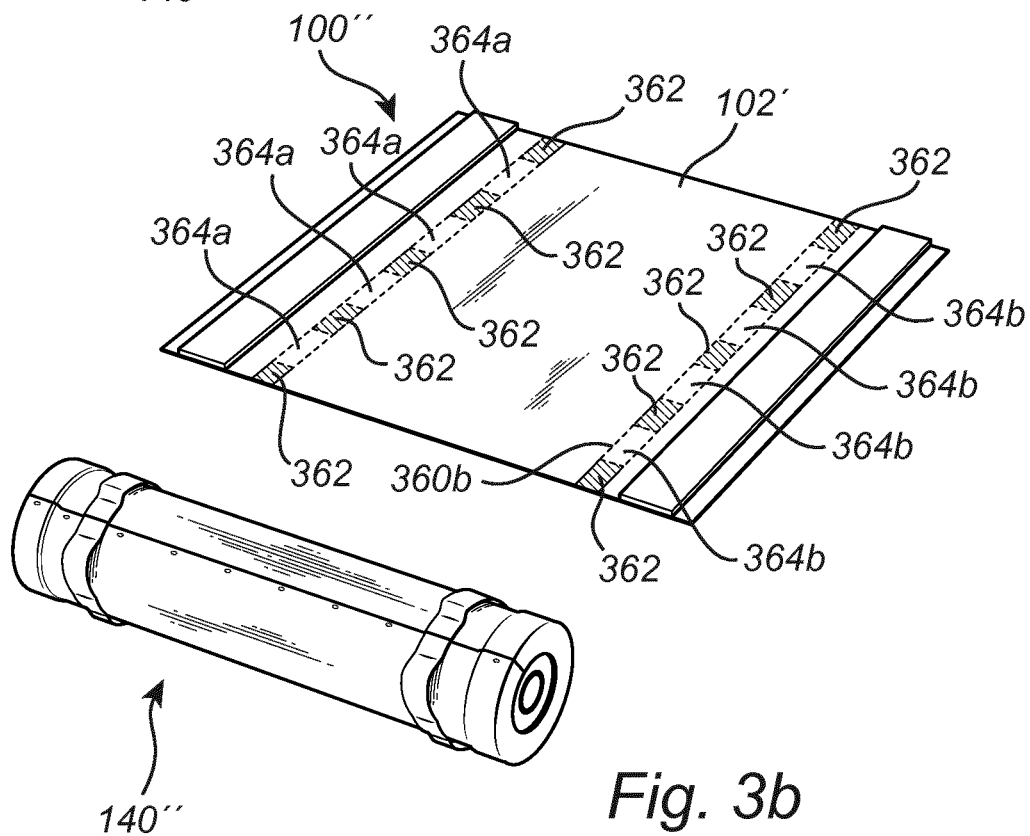
FIG. 3*b* shows an embodiment of the protective wrapping comprising handles.

FIGS. 3a and 3b show two alternative handle configurations using plastic film strips partially bonded to the plastic film sheet, such that unbonded portions of the plastic film strip forms a loop which is useful as a handle.

In FIG. 3a a protective wrapping 100' as described above with reference to FIG. 1 is further provided on an outer face of the plastic film sheet 102' with a plastic film strip 350 bonded, e.g. using a hot melt adhesive, to the outer face of the plastic film sheet in positions 352, such that unbonded portions of the strip form loops 354 which are useful as a handles. FIG. 3a further shows a wrapped reel 140' comprising a reel wrapped with the protective wrapping 200'.

In FIG. 3b a protective wrapping 100" as described above with reference to FIG. 1 is further provided on an outer face of the plastic film sheet 102" with two plastic film strips 360a, 360b bonded, e.g. using a hot melt adhesive, to the plastic film sheet in positions 362, such that unbonded portions form loops 364a, 364b which are useful as a handles. FIG. 3b further shows a wrapped reel 140" comprising a reel wrapped with the protective wrapping 200".

In a preferred embodiment the handle is made of plastic film strip made of a polyethylene based film. In a preferred embodiment, the plastic film strip used for the handle has a film thickness in the range of 100-1000 µm, preferably in the range of 100-500 µm. In the embodiments shown in FIGS. 3a and 3b, the plastic film used for the handles has a film thickness of about 300 µm.

In some embodiments, a hot melt adhesive is used for joining or securing different components of the protective wrapping. Examples where a hot melt adhesive may be used include fixing the foamed plastic strips to the plastic film sheet, securing the protective wrapping around the lateral surface, securing the protective wrapping around the edges and, for attaching a handle to the protective wrapping. The hot melt adhesive is preferably polyolefin based, more preferably hot melt adhesive comprises polyethylene.

Figure 4:
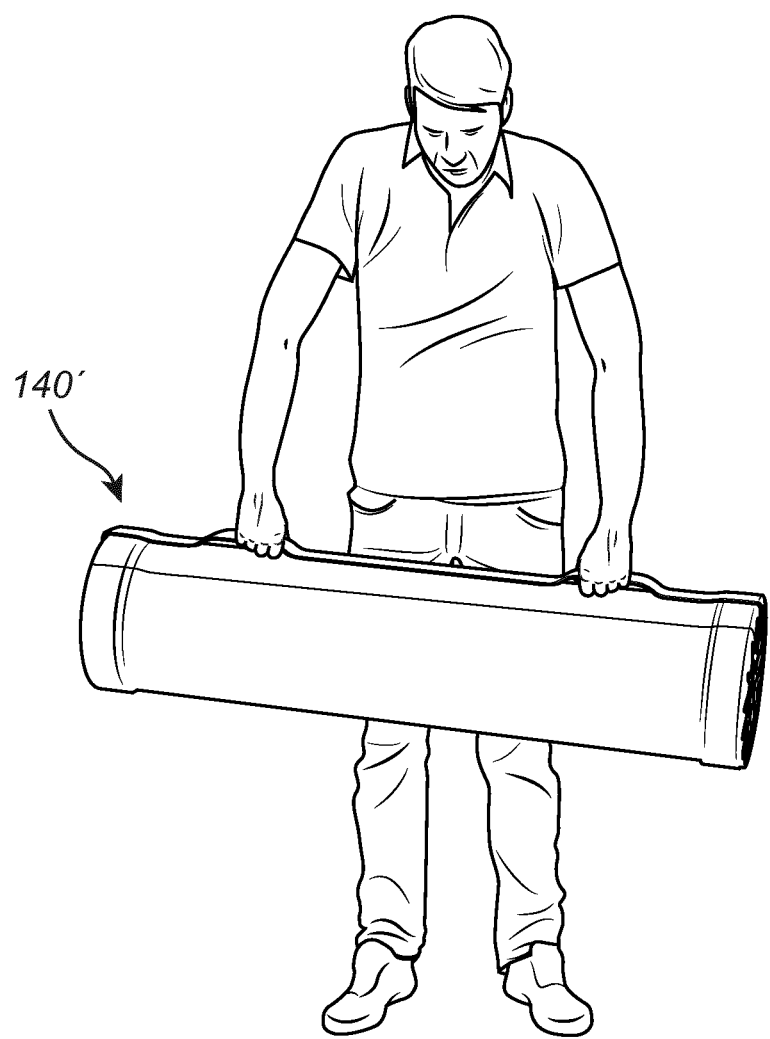
FIG. 4 shows a cylindrical object wrapped in the protective wrapping in use.

A preferred application for the protective wrapping of the invention is for packaging reels of plastic film for baling applications. Such reels typically weigh in the range of 10-100 kg and are often handled by a sole operator during loading of the reel in the bale wrapper. FIG. 4 illustrates how a wrapped reel as described above with reference to FIGS. 1 and 3a can be conveniently handled using the two handles disposed on opposite sides of a centre portion of the plastic film sheet.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A protective wrapping for a cylindrical object, comprising:
   a substantially square plastic film sheet, having a length exceeding the length of the circumference of the cylindrical object to be wrapped and a width exceeding the width of the cylindrical object to be wrapped, and having an inner face and an outer face referring to the orientation of the plastic film sheet when wrapped;

the plastic film sheet comprising two foamed plastic strips arranged on the inner or outer face thereof, the strips arranged substantially parallel in the length direction of the plastic film sheet, at a distance from each other such that the foamed plastic strips can cover and protect the edges of the cylindrical object when wrapped.

2. The protective wrapping according to claim 1, wherein the outward facing edge of the foamed plastic strips has a wavelike profile to prevent bulking of the foamed plastic strips when the protective wrapping is wrapped around the edges of the cylindrical object.

3. The protective wrapping according to claim 1, wherein the foamed plastic strips are fixed to the plastic film sheet.

4. The protective wrapping according to claim 3, where the foamed plastic strips are fixed to the plastic film sheet by means of melt bonding or an adhesive.

5. The protective wrapping according to claim 1, wherein the plastic film sheet is configured to shrink in the length direction when heated.

6. The protective wrapping according to claim 1, wherein the plastic film sheet comprises a melt adhesive arranged along the width of the sheet at at least one of the inner and the outer face thereof, such that the wrapping can be fixed by means thereof when wrapped.

7. The protective wrapping according to claim 1, wherein the melt adhesive is arranged intermittently along the width of the sheet.

8. The protective wrapping according to claim 1, wherein the plastic film sheet comprises at least one handle arranged at the outer face thereof, such that a wrapped cylindrical object can be carried by means thereof.

9. The protective wrapping according to claim 1, wherein all components of the protective wrapping are selected to be suitable for recycling together.

10. The protective wrapping according to claim 1, wherein all components of the protective wrapping are formed from the same base polymer.

11. The protective wrapping according to claim 10, wherein the base polymer is thermoplastic.

12. The protective wrapping according to claim 10, wherein the base polymer is a polyolefin.

13. The protective wrapping according to claim 12, wherein the polyolefin is a polyethylene.

14. The protective wrapping according to claim 1, wherein the protective wrapping is in one single piece.

15. A cylindrical object wrapped in a protective wrapping according to claim 1.

16. A cylindrical object wrapped in a protective wrapping according to claim 15, wherein the protective wrapping can be unwrapped in one single piece.

17. A cylindrical object wrapped in a protective wrapping according to claim 15, wherein the cylindrical object is a reel of plastic film for baling applications.

18. Use of a protective wrapping according to claim 1 for wrapping a reel of plastic film for baling applications.

* * * * *